United States Patent Office 3,357,793
Patented Dec. 12, 1967

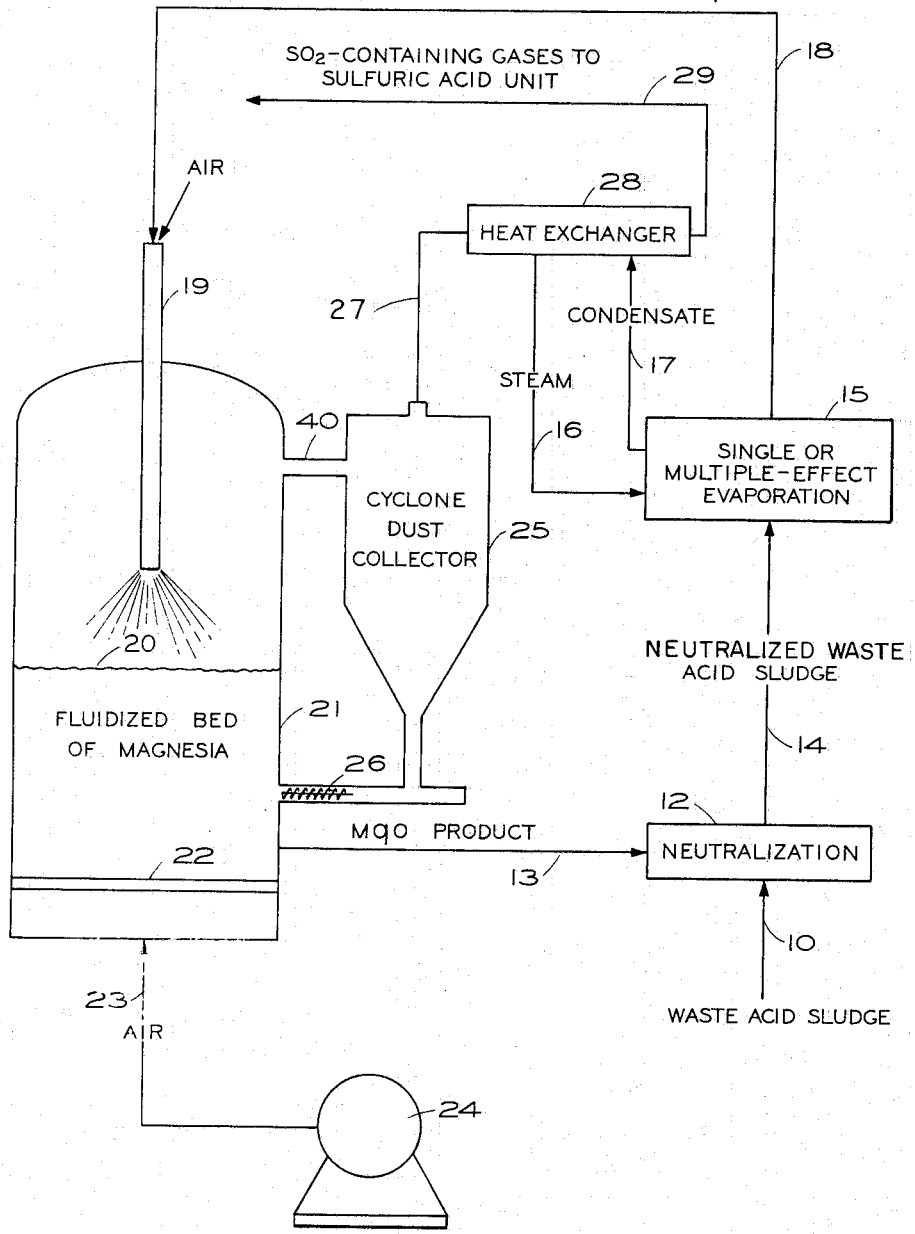

3,357,793
METHOD OF TREATING SULFURIC ACID SLUDGES
John E. Hanway, Jr., Columbus, and George R. Smithson, Grove City, Ohio, assignors, by mesne assignments, to Container Corporation of America, Chicago, Ill., a corporation of Delaware
Filed May 27, 1965, Ser. No. 459,256
8 Claims. (Cl. 23—173)

This invention relates to improvement in the recovery of chemicals from sulfur containing acid-carbonaceous waste and relates in particular to an improved magnesia recovery process in treating sulfuric acid sludge.

In many industrial processes organic or carbonaceous materials are digested or otherwise treated with sulfuric acid. Such practices generally result in a waste liquor or sludge of high-sulfate content which presents a serious disposal problem since such materials are highly corrosive so that they cannot be passed into a sewage system and it is unlawful to discharge such toxic materials into rivers and streams. Further, valuable sulfate chemicals are lost or expended when these wastes are disposed of in the conventional manner.

For example, in the petroleum industry many processing steps result in the formation of an acid sludge waste product, usually containing sulfuric acid which presents serious disposal problems as well as constituting a waste of valuable chemicals. In various of the alkylation processes where concentrated sulfuric acid is used as an alkylation catalyst, a waste product is obtained which contains from 30 to 90 percent of the sulfuric acid with the balance being some form of hydrocarbon sulfonates representing a total carbon content of up to about 10 percent of the sludge. Other acid sludges result from the treatment of petroleum products with sulfuric acid to extract various hydrocarbon fractions thus to remove undesirable constituents from the petroleum products. The nature of these sludges varies considerably depending upon the treatment used during the extraction process. Typically this type of acid sludge may contain from 40 to 80 percent sulfuric acid with the remainder consisting of undissolved carbonaceous matter, sulfonic acid, acid sulfonates, dissolved hydrocarbons, nitrogen compounds, sulfur compounds, polyolefins, and/or other complex materials.

Several methods of acid recovery (particularly from petroleum acid sludge wastes) are currently in use. Essentially these methods involve the thermal decomposition of the acid sludge at elevated temperatures in structures usually consisting of a simple cylindrical shell-type furnace with an open combustion area. Typically, the acid sludge is sprayed into the open furnace where the contained water is evaporated, the sulfur compound decomposed and the carbonaceous or organic content oxidized. In many cases, the oxidation of the carbonaceous content of the sludge is utilized to furnish at least a part of the thermal requirements of the decomposition step. Additional fuel may be added externally as required. The contained sulfur in the acid sludges are converted to gaseous sulfur oxides which are exhausted from the furnace and which are employed as feed to a more or less conventional sulfuric acid manufacturing unit.

Although the aforementioned conventional practices are presently utilized with some degree of success, it is recognized by those skilled in the art that these processes exhibit an inherent lack of efficiency, thermal economy, control, and ease of operation so as to leave much to be desired.

We have devised a method for extracting sulfates from sulfate-containing carbonaceous wastes which mitigates the disadvantages inherent in current methods of acid-sludge treatment and thus our process represents a significant improvement over the prior art procedures. Our method eliminates the corrosive environments in many steps of the treatment, provides exceptionally high thermal economy and close control of operating conditions, facilitates ease of operation, provides an over-all more efficient processing method for extracting valuable chemicals from these wastes and converts magnesia into a spheroidal form.

In general, our invention embodies the steps of (1) adding magnesia to the original acid waste to neutralize the contained sulfuric acid and to combine with all of the available sulfur in the acid with the formation of a magnesium-sulfur compound and (2) spraying the concentrated waste into a vessel having an oxidizing fluidized bed, said bed being at a temperature to cause oxidation (combustion) and disassociation of the carbonaceous or organic content of said waste to form $CO_2$ and $H_2O$ with the evolution of heat and with decomposition of the magnesium-sulfur compound into magnesia and gaseous sulfur dioxide suitable for subsequent sulfuric acid manufacture. The magnesia product, formed in the vessel, agglomerates or deposits as magnesia particles or granules of particularly desirable pure and spheroidal form. These spheroidal particles also make up the fluidized bed. The magnesia product can then be removed from the fluidized bed as it accumulates therein and optionally utilized in a recycle circuit to neutralize new waste acid material. The evolved sulfur dioxide gas can also be used in sulfate-compound manufacturing units (of conventional design).

It is an object of the present invention to provide an efficient, thermally economic, readily controlled and easily operated method for recovering sulfur compounds from carbonaceous sulfate wastes.

It is also an object of the present invention to neutralize acid-sulfur carbonaceous materials with magnesia and to spray such materials into a vessel having a fluidized bed to generate a fluidized bed of spheroidal magnesia particles.

A still further object of the present invention is to provide a method for recovering sulfur compounds from sulfuric acid-carbonaceous waste sludges which consists of neutralizing such sludges with magnesia, concentrating said sludges and spraying said concentrated sludges into a fluidized bed so as to decompose said sludge by autogenous combustion into recoverable sulfur-oxygen compounds and agglomerated spheroidal magnesia compounds.

A preferred procedure in accordance with the method of the present invention embodies the utilization of the hot-sulfur dioxide effluent gases emitted from the fluidized bed vessel in the evaporation step which concentrates the neutralized incoming acid sludge feed.

Another preferred embodiment of the present invention involves the utilization of the sulfur dioxide gases emitted from said fluidized bed in a conventional sulfuric acid manufacturing unit producing concentrated and purified sulfuric acid.

A preferred embodiment of the present invention is illustrated by the drawing which is a schematic flow sheet which demonstrates the steps of the present method.

In the drawing, sulfuric acid sludge is introduced into a neutralization vat 12 through a conduit 10. Magnesia is supplied to vat 12 through a conduit 11. Magnesia is supplied to vat 12 through a conduit 13 leading from a fluidized bed reactor oxidation unit 21. Such magnesia is added in amounts sufficient to neutralize the acid content of the waste sludge (preferably to a pH of about 7).

Magnesium-sulfur compounds, such as $MgSO_4$, are formed in the neutralization vat 12. Such materials are far less corrosive to the treatment equipment than the original waste acid sludge and may be more readily handled with significantly reduced corrosive effects on the conduits and equipment through which it subsequently flows.

The neutralized waste-acid sludge is conveyed from vat 12 to a container 15 through conduit 14. Container 15 may be an evaporator apparatus of conventional structure employed to concentrate carbonaceous or organic materials. Such unit may consist of a multiple-effect evaporation system or a single-effect evaporation system. The significant effect of this piece of equipment is entirely predicted on driving out a sufficient portion of the water to raise the combustible solids content for subsequent autogenous treatment.

It will, of course, be understood that the degree of evaporation is optional since the autogenous combustion feature though obviously preferred is not essential to the method of the present invention. If less than an autogenous quantity of combustible materials is present in the concentrated sludge supplemental heat may be supplied to the fluidized bed to complete the reaction and if more than the autogenous quantity is present, then heat may be removed from the fluidized bed by known means such as heat exchangers. We have found that on a carbon basis, the extent of evaporation must be carried to the point at which the sludge or waste contains hydrocarbon material representing a total carbon content of about 12 to 25 percent if autogenous combustion is to be supported.

The concentrated acid sludge or waste material is introduced into the fluidized-bed reactor 21 through a conduit 18 and a spray mechanism 19. Spray mechanism 19 consists of spray nozzles and atomizing devices of conventional construction that are disposed to convert the concentrated wastes into a fine spray which is directed onto the freeboard area 20 of the fluidized-bed particles. We have had particular success in utilizing pneumatic-type feed nozzles for the mechanism 19. The concentrated and neutralized waste-acid sludge is pneumatically dispersed onto the freeboard area 20 by the introduction of intermediate pressure air into such a feed mechanism. Control of the pressure and relative volume of air and the waste acid sludge regulates the degree of dispersion of the sludge or waste as it is introduced into the freeboard 20 of the fluidized bed.

As the waste acid sludge is introduced into the freeboard of the fluidized-bed reactor, part of the remaining water (after pre-concentration in vessel 15) is evaporated by the sensible heat of the exhaust gases from the fluidized bed. The remaining sludge material is deposited on the fluidized particles of magnesia within the bed itself. The carbonaceous or organic portion of the feed is then oxidized within the fluidized bed and converted to carbon dioxide and water vapor which escapes from the reactor vessel with the exhaust gases. The magnesium-sulfur compounds present in the sludge feed are thermally decomposed in the fluidized bed to yield magnesia and gaseous sulfur-oxides as products. The gaseous sulfur-oxides (predominantly $SO_2$) pass out of the reactor with the exhaust gas and the magnesia remains within and adds to the fluidized bed of granular magnesia particles.

As contrasted with prior practices where alkali metal and alakine earth metal oxides are recovered from a smelt after combustion in conventional furnace structures, a portion of the magnesia produced by the aforementioned decomposition is formed into "fines" or dust-sized particles. The remaining portion of the magnesia deposits on the nucleating fines or existing fluid-bed magnesia particles to enlarge the fines into fluid-bed particles and cause the existing particles to grow. Such phenemenon effects the growth of nearly perfect spheroidal particles, generally within the range of 20 to 100 mesh. Such particles not only form an ideal material for a fluidized bed but are ideal of reintroduction into acid wastes or for other industrial applications and require no further purification or grinding but consist of a usable product.

In a continuous process magnesia continuously deposits on the existing fluidized-bed particles as well as forming new particles. The spheroids of magnesia can be continuously withdrawn from the fluidized bed at a rate corresponding to the rate of formation. By regulating the flow of fluidized air, temperature and spray one can readily regulate the size of the particles being withdrawn so that a uniform product of predetermined mesh may be readily obtained.

Small particles of magnesia which have not had an opportunity to agglomerate may be entrained in the exhaust gases. These gases consisting of $CO_2$ from the combusting organic materials, water vapor from the waste or sludge and sulfur-oxygen materials (mostly $SO_2$) from the disassociated magnesia-sulfur compounds leave the fluid-bed reactor 21 through port 40 and enter a cyclone dust collector 25. The small magnesia particles that have not had an opportunity to agglomerate are entrained in these exhaust gases. These small particles are separated in the cyclone dust collector 25 and returned to the fluidized bed through a screw conveyor 26.

The MgO-free exhaust gases pass through a conduit 27 to a heat exchanger 28 where the sensible heat of these gases is recovered to supply thermal energy to the evaporation container 15 through conduits 16 and 17. As previously stated, this heat or evaporation step is regulated to provide a waste of preselected concentrations of combustible organic or carbonaceous content that will supply autogenous or self-supporting heat to the fluidized bed. The sludge generally should have a carbon content of at least 12 percent by weight to support autogenous combustion in the fluidized bed. Most suitable operation is achieved if the evaporated sludge contains about 15 to 25 percent carbon, a temperature within the preferred range of about 1200° F. to 1800° F. is sustained in the fluidized bed, and build up of magnesia particles is constant.

Cooled exhaust gases pass from heat exchanger 28 through conduit 29 to a conventional sulfuric acid manufacturing unit, such as the contact type, for the production of a concentrated and purified sulfuric acid which can be recycled through the processing operation which created the waste or sludge.

The fluidized magnesia particles of the bed are maintained in their fluidized state by a stream of air introduced into the fluidized-bed reactor through conduit 23 from blower 24. Air passing through a distributor plate 22 maintains even air distribution within. The air is advisably supplied in 10 to 80 percent excess above the stoichiometric amount necessary for complete combustion of the carbonaceous content of the concentrated acid sludge. Such apparatus is conventional and well-known to those skilled in the art. The gas introduced is specified as air, however, it will be obvious that any gas capable of maintaining an oxidizing atmosphere within the fluidized bed furnace 21 can be employed.

Magnesia particles are periodically removed from the bottom of the fluidized bed by conventional means so that a constant supply of magnesia is provided through conduit 13 for further neutralization of new waste-acid sludge.

While we have illustrated and described herein the best form of our invention now known to us, those skilled in the art will understand that changes may be made in the form of apparatus and operation of our process without departing from the spirit of the invention covered by our claims.

What is claimed is:

1. A method of treating liquid wastes which contain sulfuric acid and combustible carbonaceous materials comprising:

(a) neutralizing said waste with magnesia;
(b) oxidizing said neutralized waste by combustion in a vessel having a bed of magnesia particles fluidized by an oxygen containing gas;
(c) collecting the effluent gases formed by said combustion and separating the sulfur-oxygen gases therefrom; and
(d) withdrawing spheroidal magnesia particles from said bed to maintain the bed at a predetermined capacity.

2. The method set forth in claim 1 including the step of concentrating said liquid waste after said neutralization and prior to said oxidizing, to a carbon content of at least about 12 percent by weight so that said liquid waste will autogenously support combustion in the fluidized bed.

3. A method of treating liquid waste materials which contain sulfuric acid and combustible carbonaceous materials comprising:
(a) neutralizing said waste with magnesia so as to form magnesium-sulfur compounds;
(b) concentrating said neutralized waste to a carbon content of about 15 to 25 percent by weight;
(c) spraying said neutralized and concentrated waste into a vessel having a bed of magnesia particles fluidized by an oxygen containing gas;
(d) autogenously burning said waste in the bed at a temperature of from 1200° F. to 1800° F., said liquid evaporating, said combustible carbonaceous material burning, and said magnesium-sulfur compounds disassociating to form effluent sulfur-oxygen gas and magnesia particles;
(e) collecting the effluent gases from said bed and separating the sulfur-oxygen gases therefrom; and
(f) withdrawing spheroidal magnesia particles from said bed to maintain the bed at a predetermined capacity.

4. A method of recovering concentrated and purified sulfuric acid from sulfuric acid sludge wastes comprising:
(a) adding sufficient magnesia to the waste acid sludge to neutralize the acid with the formation of magnesium-sulfur compounds;
(b) concentrating the neutralized acid sludge to a centration such that the proportion of carbonaceous material originally contained in the acid sludge is present in such a value as sufficient to support autogenous combustion in a fluidized-bed furnace;
(c) oxidizing the concentrated neutralized sludge containing magesium-sulfur compounds and carbonaceous material in fluidized-bed furnace without the application of external heat wherein the carbonaceous material is oxidized to carbon dioxide and water with the evolution of heat, the magnesium-sulfur compounds and other compounds present containing sulfur are decomposed into gaseous sulfur oxides and magnesia;
(d) depositing the magnesia product of combustion on the bed particles to form spherical pellets comprising the matter of the fluidized bed;
(e) withdrawing the magnesia product from the fluidized bed as it accumulates therein;
(f) utilizing the withdrawn magnesia in a circulating manner to neutralize the incoming sludge acid material;
(g) cooling the sulfur oxide gases and thus recovering the sensible heat contained therein; and
(h) introducing the cooled sulfur oxide gases into a sulfuric acid manufacturing unit, and withdrawing sulfuric acid from the acid-manufacturing unit.

5. Process according to claim 4 wherein said oxidation is carried on within the temperature limits of 1200° F. to 1800° F.

6. Process according to claim 4 wherein the waste sludge acid is concentrated during the evaporation step to contain from 15 to 25 percent by weight of total carbon.

7. A process according to claim 4 wherein the fluidizing air for combustion is supplied in an amount from 10 to 80 percent in excess of the stoichiometric amount necessary for complete combustion of the carbonaceous content of the concentrated sludge acid.

8. A process according to claim 4 wherein the magnesia oxide decomposition product is produced in the oxidation furnace as spherical pellets within the particle size range of 20 to 100 mesh.

References Cited
UNITED STATES PATENTS 2,406,890  9/1946  Mohr _____ 23—177
2,596,241  5/1952  Helleur _____ 23—201 X

FOREIGN PATENTS 619,686  5/1961  Canada.

OSCAR R. VERTIZ, *Primary Examiner.*

A. GREIF, *Assistant Examiner.*

UNITED STATES PATENT OFFICE
CERTIFICATE OF CORRECTION

Patent No. 3,357,793                             December 12, 1967

John E. Hanway, Jr., et al.

It is hereby certified that error appears in the above numbered patent requiring correction and that the said Letters Patent should read as corrected below.

Column 3, line 62, for "alakine" read -- alkaline --; line 70, after "effects the" insert -- generation and --; line 74, for "of" read -- for --.

Signed and sealed this 31st day of December 1968.

(SEAL)
Attest:

Edward M. Fletcher, Jr.

Attesting Officer

EDWARD J. BRENNER

Commissioner of Patents